United States Patent
Wang et al.

(10) Patent No.: US 10,054,749 B1
(45) Date of Patent: Aug. 21, 2018

(54) OPTICAL CHIP-SCALE PACKAGE FOR USE IN A HIGH CHANNEL DENSITY, HIGH DATA RATE DATA COMMUNICATIONS SYSTEM HAVING OPTICAL INPUT/OUTPUT (I/O) PORTS

(71) Applicant: Avago Technologies General IP (Singapore) Pte. Ltd., Singapore (SG)

(72) Inventors: Tak Kui Wang, San Jose, CA (US); Chung-Yi Su, Fremont, CA (US); Nick Jordache, Fleetwood, PA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/582,446

(22) Filed: Apr. 28, 2017

Related U.S. Application Data

(60) Provisional application No. 62/484,794, filed on Apr. 12, 2017.

(51) Int. Cl.
*G02B 6/42* (2006.01)
*H04Q 11/00* (2006.01)

(52) U.S. Cl.
CPC .......... *G02B 6/4256* (2013.01); *G02B 6/425* (2013.01); *G02B 6/428* (2013.01); *G02B 6/4228* (2013.01); *G02B 6/4272* (2013.01); *G02B 6/4273* (2013.01); *G02B 6/4292* (2013.01); *H04Q 11/0005* (2013.01)

(58) Field of Classification Search
CPC .............................. G02B 6/425; G02B 6/4274
See application file for complete search history.

(56) References Cited

U.S. PATENT DOCUMENTS

| | | | |
|---|---|---|---|
| 5,424,573 A * | 6/1995 | Kato | G02B 6/4249 257/116 |
| 8,842,952 B2 * | 9/2014 | Tanaka | G02B 6/42 385/14 |
| 9,188,751 B2 | 11/2015 | Wang | |
| 9,488,791 B2 | 11/2016 | Chang et al. | |
| 9,564,555 B2 | 2/2017 | Koehler et al. | |
| 9,620,934 B2 | 4/2017 | Su et al. | |
| 2004/0207991 A1 | 10/2004 | Oki et al. | |
| 2007/0165979 A1 * | 7/2007 | Oda | H01L 25/167 385/14 |
| 2015/0063760 A1 | 3/2015 | Pommer et al. | |
| 2016/0124164 A1 * | 5/2016 | Doerr | G02B 6/423 385/14 |

OTHER PUBLICATIONS

Co-pending U.S. Appl. No. 15/476,344, filed Mar. 31, 2017.

* cited by examiner

*Primary Examiner* — Omar R Rojas
(74) *Attorney, Agent, or Firm* — Sheridan Ross P.C.

(57) ABSTRACT

An optical chip-scale package (CSP) is provided for use in a high channel density, high data rate communications system that has optical I/O ports and that is capable of being housed in a standard rackmount-sized box. The optical I/O ports comprise a bulkhead of multi-optical fiber (MF) adapters installed in a front panel of a switch box that houses the communications system. The adapters have first and second receptacles that are adapted to mate with first and second MF connectors, respectively. The communications system comprises a single-harness optical subassembly that uses a plurality of the optical CSPs that interface with a switch IC chip of the communications system to perform electrical-to-optical and optical-to-electrical conversion.

21 Claims, 19 Drawing Sheets

OPTICAL CHIP-SCALE PACKAGE FOR USE IN A HIGH CHANNEL DENSITY, HIGH DATA RATE DATA COMMUNICATIONS SYSTEM HAVING OPTICAL INPUT/OUTPUT (I/O) PORTS

CROSS-REFERENCE TO RELATED APPLICATIONS

This application is a U.S. nonprovisional application that claims priority to and the benefit of the filing date of U.S. provisional application Ser. No. 62/484,794, filed on Apr. 12, 2017, entitled "A HIGH CHANNEL DENSITY, HIGH DATA RATE DATA COMMUNICATIONS SYSTEM HAVING OPTICAL INPUT/OUTPUT (I/O) PORTS," which is hereby incorporated by reference herein in its entirety.

FIELD OF THE INVENTION

The invention relates to data communications. More particularly, the invention relates to an optical chip-scale package (CSP) for use in a high channel density, high data rate data communications system having optical input/output (I/O) ports.

BACKGROUND OF THE INVENTION

A typical switch box is a data communications system that has at least one switch integrated circuit (IC) chip mounted on a printed circuit board (PCB) and a large number of electrical I/O ports. In high channel density, high data rate switch boxes, the switch IC chip has a large number of channels and performs a large number of switching operations at very high speed. Such switch IC chips use a large amount of electrical current and generate large amounts of heat. The switch box includes a housing that is typically a metal box of a standard rackmount size having a front panel in which the I/O ports are disposed and a bottom on which the PCB is disposed. Various types of heat dissipation solutions are used in switch boxes to dissipate the heat generated by the switch IC chips, but they typically include devices that spread the heat (e.g., thermal pads and heat spreaders) and devices that convectively remove heat (e.g., fans and plenums).

In some data communications systems, the electrical I/O ports are replaced with optical I/O ports. In such cases, the electrical signals that are output from the switch IC chip are converted from the electrical domain to the optical domain and sent over optical waveguides (e.g., optical fibers) to the optical I/O ports. The optical signals that are received via the optical I/O ports are converted from the optical domain to the electrical domain and digitized before being input to the switch IC chip.

Standards exist that define different sizes for the metal box that houses the components of the system. To accommodate high channel count and high data rate, a larger box needs to be used in order to accommodate all of the optical, electrical and optoelectronic components as well has a robust thermal management system.

A need exists for an optical CSP that is suitable for use in a high channel density, high data rate communications system having optical I/O ports and that enables the system to be housed in a smaller box than that which would typically be needed to house a high channel density, high data rate communications system with optical I/O ports and a robust thermal management solution.

WRITTEN DESCRIPTION

Figure 1:
FIG. 1 illustrates a perspective view of the high channel density, high data rate communications system in accordance with a representative embodiment.

In accordance with representative, or exemplary, embodiments described herein, an optical CSP is provided for use in a high channel density, high data rate communications system, which has optical I/O ports and is capable of being housed in a standard rackmount-sized box. In accordance with a representative embodiment, the optical I/O ports comprise a bulkhead of Multi-Fiber Push-On (MPO) adapters installed in a front panel of a switch box that houses the communications system. The MPO adapters have first and second receptacles that are adapted to mate with first and second MPO connectors, respectively. In accordance with a representative embodiment, the communications system comprises a single-harness optical subassembly that, in combination with an optical multi-chip module (MCM) and a plurality of the optical CSPs, performs electrical-to-optical (E/O) and optical-to-electrical (O/E) conversion and interfaces the optical I/O ports with a switch IC chip of the communications system. In accordance with a representative embodiment, the communications system includes a thermal dissipation system that thermally isolates heat generated by the switch IC chip from heat generated by E/O and O/E conversion devices of the optical CSPs of the single-harness optical subassembly.

The term "MPO connector," as that term is used herein, denotes a multi-optical fiber connector that is defined by International Electrotechnical Commission (IEC)-61754-7 "Fibre optic interconnecting devices and passive components—Fibre optic connector interfaces—Part 7: Type MPO connector family"; and Telecommunications Industry Association (TIA)-604-5-D, "Fiber Optic Connector Intermateability Standard, Type MPO." It should be noted that while the representative embodiments are described herein with reference to the I/O ports comprising adapters configured to mate with MPO connectors, the I/O ports could be configured to mate with other types of multi-optical fiber (MF) connectors. For ease of discussion and illustration, it will be assumed throughout the following description that the adapters of the I/O ports are configured to mate with MPO connectors and that the MF connectors that are used with the adapters are MPO connectors.

In the following detailed description, for purposes of explanation and not limitation, exemplary, or representative, embodiments disclosing specific details are set forth in order to provide a thorough understanding of the inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art.

It should also be understood that the word "example," as used herein, is intended to be non-exclusionary and non-limiting in nature. More particularly, the word "exemplary," as used herein, indicates one among several examples, and it should be understood that no undue emphasis or preference is being directed to the particular example being described. It should also be understood that the word "exemplary," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The term "substantially" means to within limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Where a first device is said to be directly connected or directly coupled to a second device, this encompasses examples where the two devices are connected together without any intervening devices other than bonding material or devices. Where a first device is said to be coupled to a second device, this encompasses examples where the two devices are directly connected together without any intervening devices other than bonding material or devices and examples where the first and second devices are connected to one another via one or more intervening devices.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts. Prior to describing features of the optical CSP module, a representative embodiment of a high channel density, high data rate communications system in which the optical CSP module may be used will be described with reference to FIGS. 1-12. The optical CSP module will then be described with reference to FIGS. 13A-17.

FIG. 1 illustrates a perspective view of the high channel density, high data rate communications system 1 in accordance with a representative embodiment. In accordance with this representative embodiment, the system 1 is housed in a standard metal 1 U rackmount box 2, although the inventive principles and concepts are not limited with respect to the housing that is used for the system 1. Housing the system 1 in the standard metal 1 U rackmount box 2 has certain advantages. One advantage is that it ensures that the system 1 can be used with existing 1 U rackmounts commonly used in high data volume applications such as in a data center, for example. Another advantage is it allows the current IC switch positioning and associated thermal dissipation system used in a current switch box that uses electrical rather than optical I/O ports to be used in the system 1 with optical I/O ports 3. This latter advantage will be described below in more detail with reference to FIGS. 10A and 10B.

In accordance with this representative embodiment, the optical system 1 comprise first and second bulkhead adaptors 4 and 5, respectively, each having sixteen I/O ports 6. Each of the I/O ports 6 has a receptacle on a front side of the front panel 7 of the box 2 that is configured to mate with respective MPO connector (not shown). In accordance with this representative embodiment, each of the MPO connectors has a ferrule that holds ends of sixteen optical fibers, eight of which are transmit optical fibers and eight of which are receive optical fibers. In accordance with this representative embodiment, the back sides of the I/O ports 6 are connected to ends of sixteen optical fibers (not shown), eight of which are transmit optical fibers and eight of which are receive optical fibers. Thus, in accordance with this representative embodiment, each I/O port 6 supports eight transmit optical fibers and eight receive optical fibers.

Figure 2:
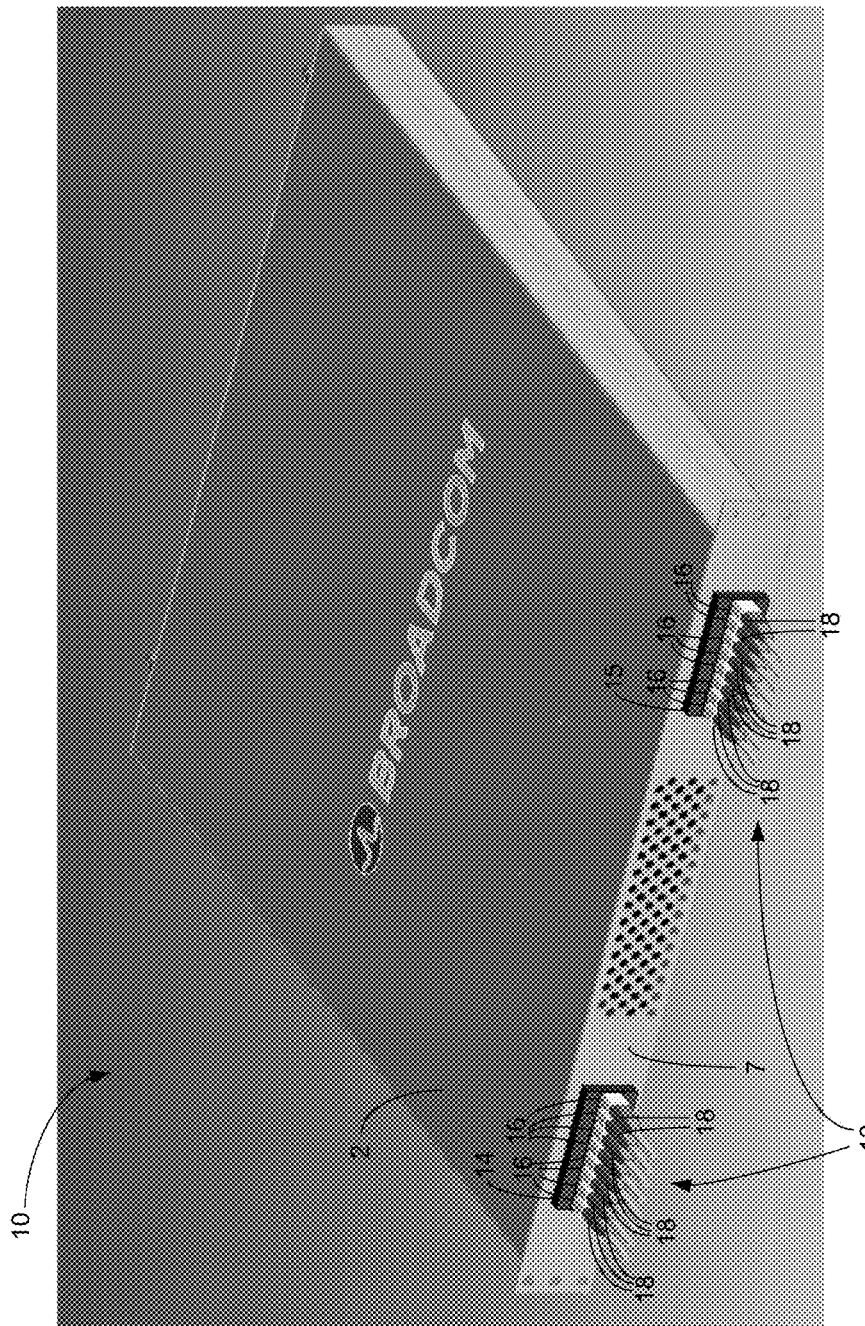
FIG. 2 illustrates a perspective view of the high channel density, high data rate communications system in accordance with a representative embodiment.

FIG. 2 illustrates a perspective view of the high channel density, high data rate communications system 10 in accordance with another representative embodiment. In accordance with this representative embodiment, the system 10 is housed in a standard metal 1 U rackmount box 2 and the optical I/O ports 13 of the system 10 comprise first and second bulkhead adapters 14 and 15, respectively, each having eight I/O port 16, as compared to the first and second bulkhead adapters 4 and 5 shown in FIG. 1, which have sixteen I/O ports 6 each. Each of the I/O ports 16 has a receptacle on a front side of the front panel 7 of the box 2 that is configured to mate with respective MPO connector 18. In accordance with this representative embodiment, the MPO connectors that mate with the receptacles of the I/O ports 16 have respective ferrules disposed therein that hold ends of eight transmit optical fibers and eight receive optical fibers. The back sides of each of the I/O ports 16 are connected to ends of thirty two optical fibers, sixteen of which are transmit optical fibers and sixteen of which are receive optical fibers.

In accordance with this representative embodiment, the fiber subassembly (not shown) of the system 10 includes wavelength division multiplexing/demultiplexing devices that multiplex at least two optical signals of two different wavelengths onto ends of eight of the sixteen optical fibers held in the ferrules of the MPO connectors 18. Similarly, optical signals from eight of the optical fibers held in each of the MPO connectors 18 are demultiplexed onto ends of sixteen optical fibers connected to the back side of the respective I/O ports 16. Therefore, as with the system 1 shown in FIG. 1, the system 10 shown in FIG. 2 has 512 channels, but the system 10 uses one-half of the number of optical fibers used on the front side of the front panel 7 in FIG. 1. The system 10 also uses one-half of the number of MPO connectors and corresponding cables used by the system 1. Each optical fiber held in one of the ferrules of the MPO connectors 18 carries two optical signals, and therefore carries twice the data capacity as compared to the system 1 shown in FIG. 1.

Representative embodiments of the multiplexing/demultiplexing modules are described in U.S. application Ser. No. 15/476,344, filed on Mar. 31, 2017, which is assigned to the assignee of the present application and which is hereby incorporated by reference herein in its entirety. In the representative embodiment depicted in FIG. 2, multiplexing/demultiplexing modules (not shown) are connected to the second receptacles disposed on the back side of the front panel 7 and are configured to mate with a fiber assembly that holds ends of thirty-two optical fibers. In the transmit direction, the optical signals passing out of the ends of the sixteen optical fibers are MUXed onto the ends of eight optical fibers held in the MPO connector mated with the first receptacle on the front side of the front panel. In the receive direction, the optical signals passing out of the ends of the eight optical fibers held in the MPO connector mated with the first receptacle on the front side of the front panel are DEMUXed into the ends of sixteen optical fibers connected to the back side of the respective I/O port 6 on the back side of the front panel 7.

Figure 3:
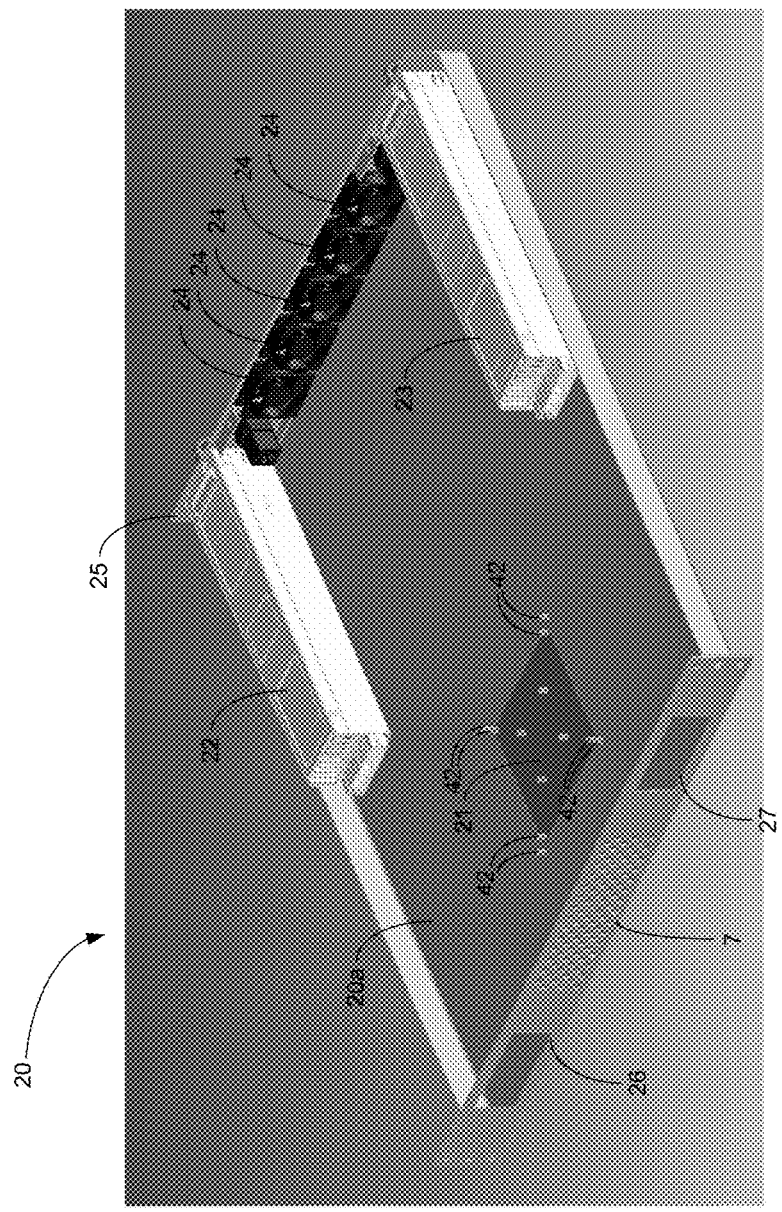
FIG. 3 illustrates a top perspective view of a bottom portion of the box of the system shown in FIG. 1 having a top surface to which a thermal pad is secured.

FIG. 3 illustrates a top perspective view of a bottom portion 20 of the box 2 shown in FIG. 1 having a top surface 20a to which a thermal pad 21 is secured. The box 2 has first and second power supplies 22 and 23, respectively, mounted therein. A plurality of fans 24 are located in a back panel 25 of the box 2 for providing convective cooling. The front panel 7 has first and second openings 26 and 27 formed therein into which the bulkheads 4 and 5 are inserted and secured, respectively.

Figure 4:
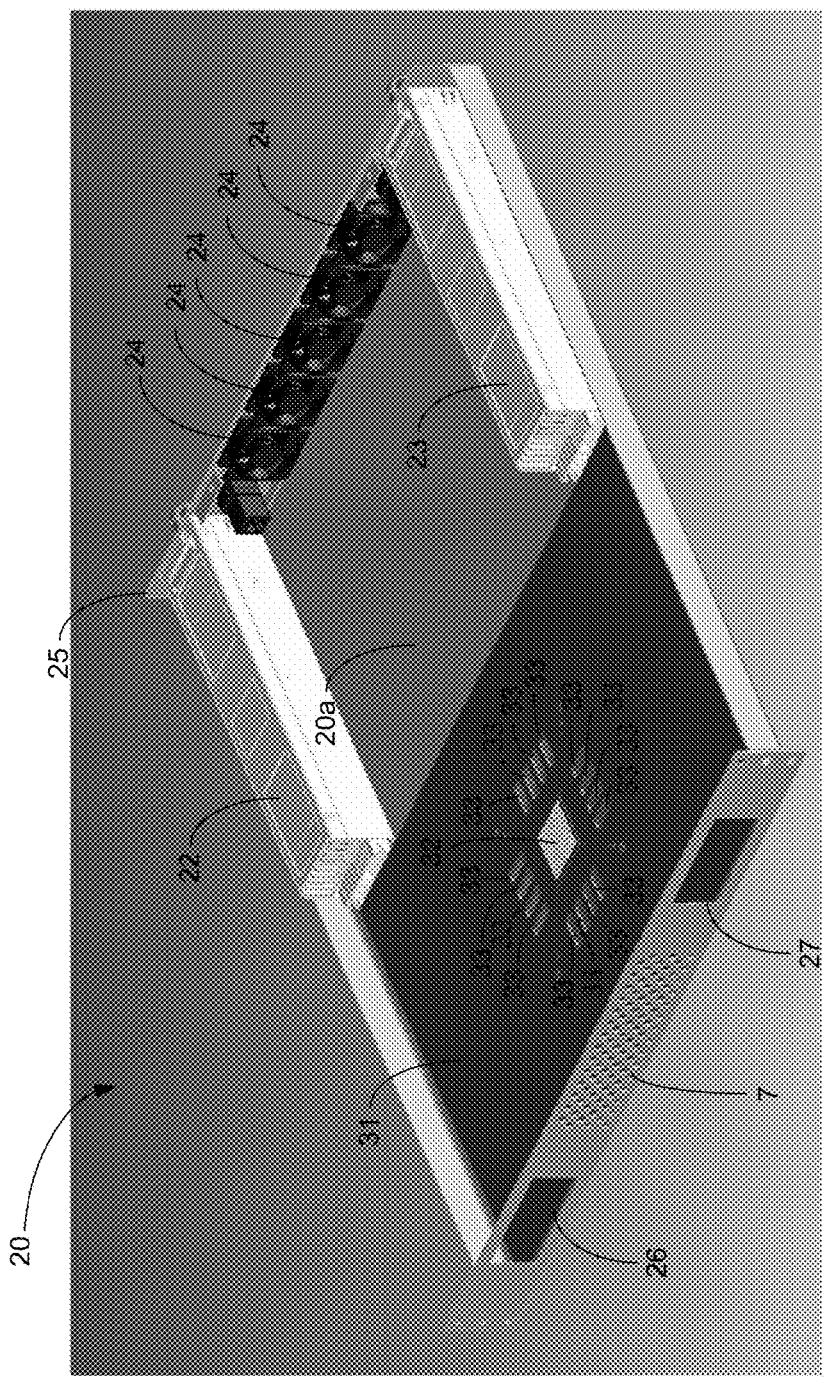
FIG. 4 illustrates a top perspective view of the bottom portion of the box shown in FIG. 3 having a PCB mounted on the top surface of the bottom portion of the box and having an electrical interface mounted on the PCB over the thermal pad.

FIG. 4 illustrates a top perspective view of the bottom portion 20 of the box 2 shown in FIG. 3 having a PCB 31 mounted on the top surface 20a of the bottom portion 20 and having an electrical interface 32 mounted on the PCB 31 over the thermal pad 21 (FIG. 3). The PCB 31 has a plurality of openings 33 formed therein above the thermal pad 21 that facilitate heat dissipation, as will be described below in more detail.

Figure 5:
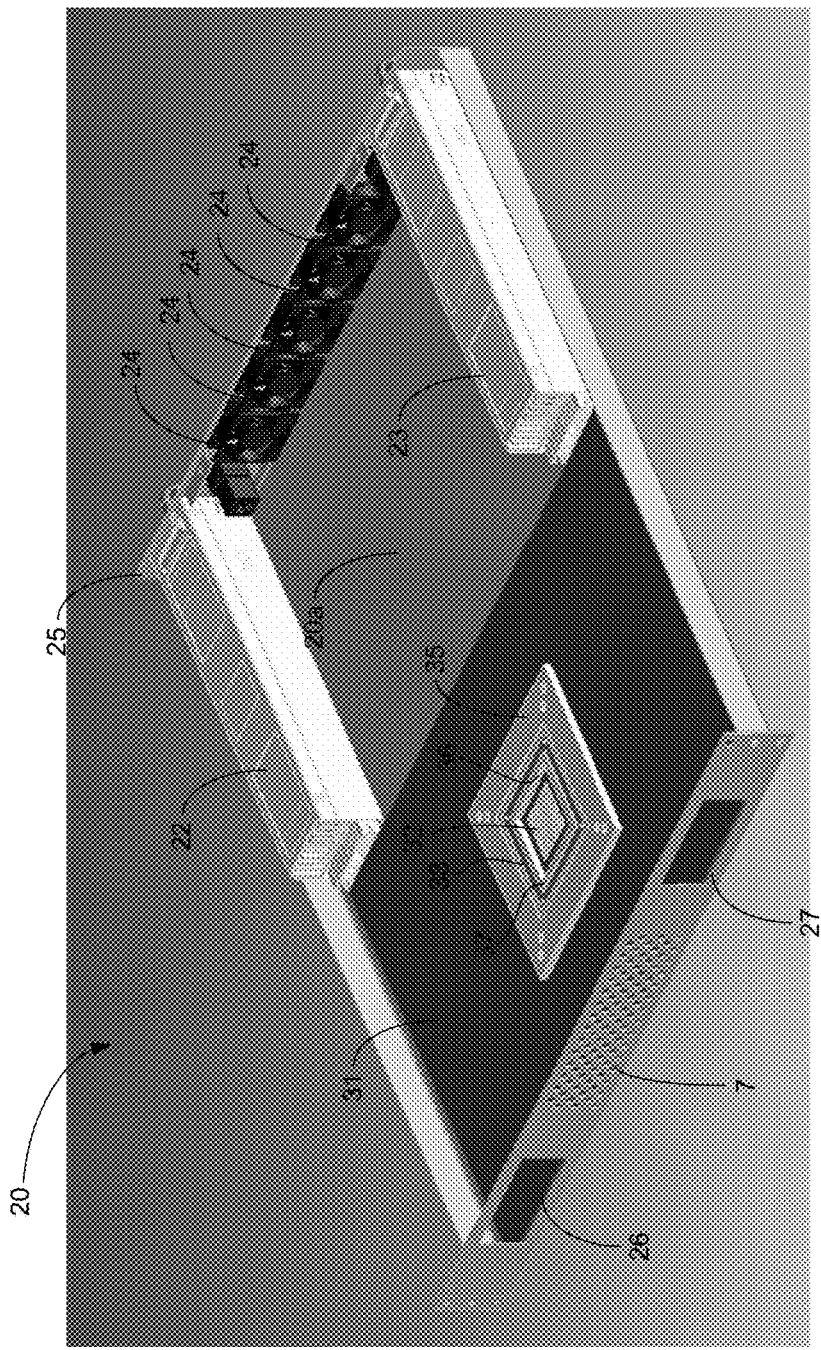
FIG. 5 illustrates a top perspective view of the bottom portion of the box shown in FIG. 4 having a metal adapter mounted on the PCB.
Figure 6A:
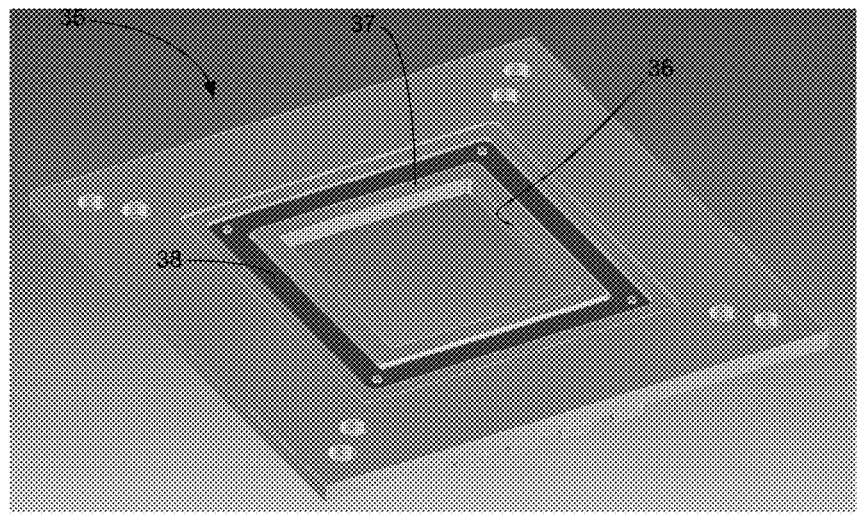
FIGS. 6A and 6B illustrate top and bottom perspective views, respectively, of the adapter shown in FIG. 5.
Figure 6B:
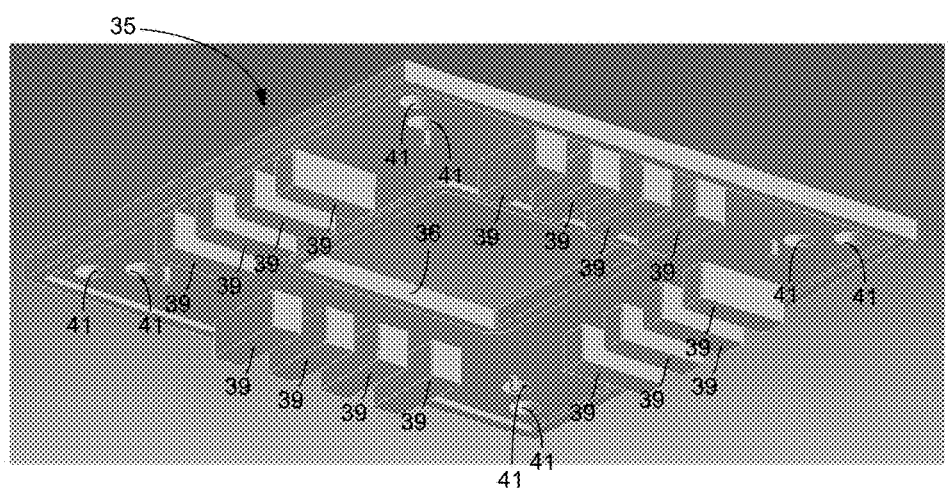
Figure 7A:
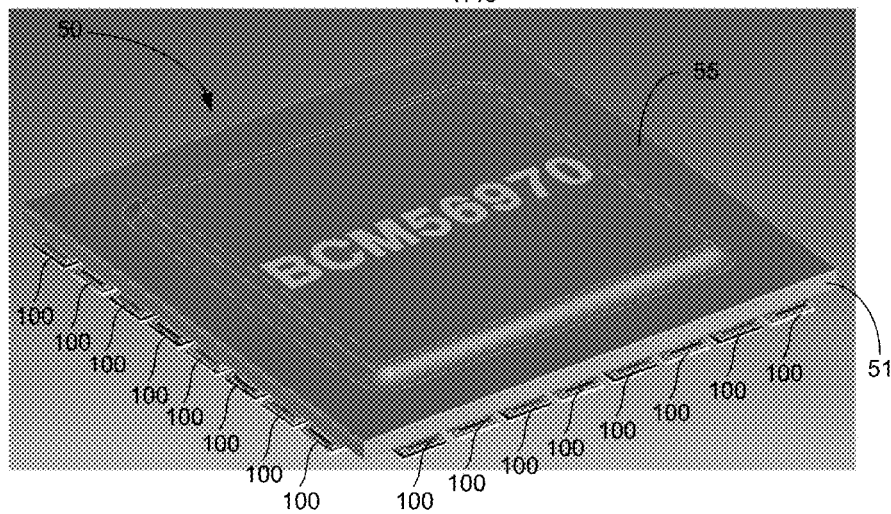
FIGS. 7A and 7B illustrate top and bottom perspective views, respectively, of an optical multi-chip module (MCM) of the data communications system shown in FIG. 1 in accordance with a representative embodiment.
Figure 7B:
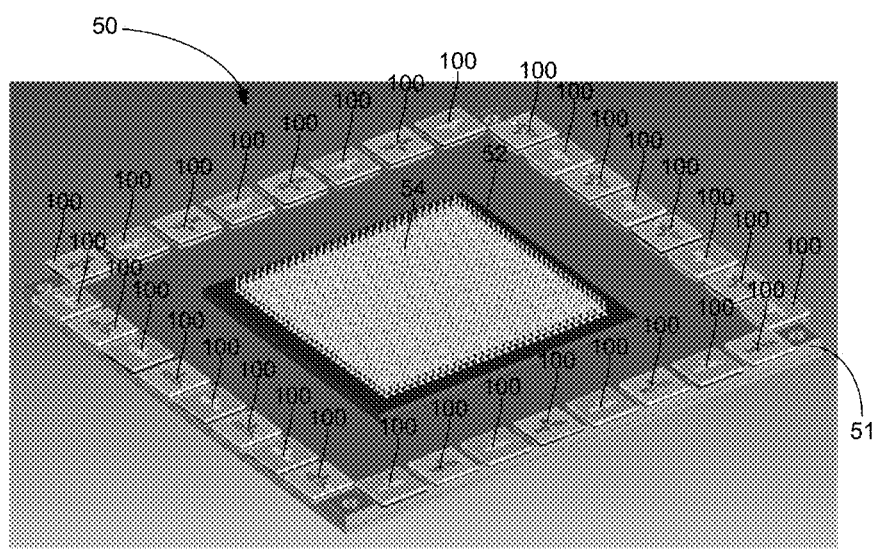

FIG. 5 illustrates a top perspective view of the bottom portion 20 of the box 2 shown in FIG. 4 having a metal adapter 35 mounted on the PCB 31. FIGS. 6A and 6B illustrate top and bottom perspective views, respectively, of the adapter 35. FIGS. 7A and 7B illustrate top and bottom perspective views of the optical MCM 50 that is mounted on the adapter 35 in accordance with an embodiment. The adapter 35 has an opening 36 therein through which the electrical interface 32 is exposed. The adapter 35 has a mounting flange 37 adjacent the opening 36 on which the optical MCM 50 (FIGS. 7A and 7B) mounts. The mounting flange 37 has a thermally-conductive material 38 thereon that is used to conduct heat from the optical CSP (not shown) to the body of the metal adaptor 35. The lower surface of the metal adapter 35 has heat blocks 39 formed therein that are shaped and sized to fit through the openings 33 (FIG. 4) formed in the PCB 31 to allow the heat blocks 39 to mechanically and thermally couple to the thermal pad 21 (FIG. 3) when the adapter 35 is mounted on the PCB 31.

The adapter 35 has holes 41 (FIG. 6B) in it that receive fastening screws (not shown) that couple to swage nuts 42 (FIG. 3) that extend from the bottom surface 20a of the bottom portion 20 through the thermal pad 21 and through the PCB 31 when the adapter 35 is mounted on the PCB 31. Spaces 43 on the bottom surface of the adapter 35 provide proper clearance between the holes 41 and the holes in the PCB 31 so that the fastening screws used to fasten the adapter 35 to the PCB 31 do not stress the electrical interface 32 in the lateral directions.

With reference to FIGS. 7A and 7B the optical MCM 50 comprising an organic substrate 51, an electrical connector 52 centered in the organic substrate 51 and having an array of electrical contacts 54 disposed on a lower surface thereof, a plurality of optical CSPs 100 disposed about a periphery of the organic substrate 51, a metal lid 55, and a switch IC chip (not shown) that is covered by the lid 55. The electrical contacts 54 of the electrical connector 52 interface with the electrical interface 32 (FIG. 4) when the optical MCM 50 is mounted on the mounting flange 37 of the adapter 35 (FIG. 5). The switch IC chip (not shown) is set between the organic substrate 51 and the metal lid 55. In accordance with this representative embodiment, portions of each of the optical CSPs 100 extend slightly beyond the periphery of the organic substrate 51 (FIG. 7A).

Figure 8:
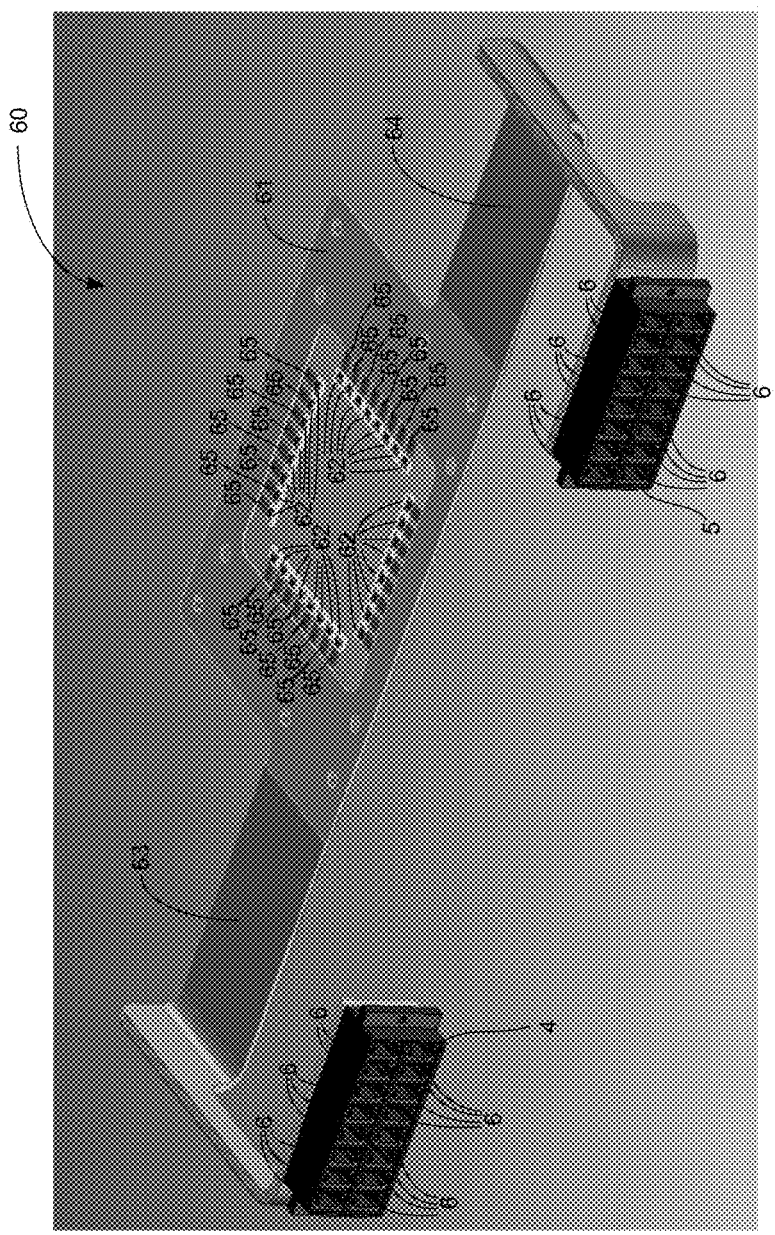
FIG. 8 illustrates a top perspective view of a single-harness optical subassembly of the data communications system shown in FIG. 1 in accordance with a representative embodiment shown secured to the first and second bulkheads shown in FIG. 1.

FIG. 8 illustrates a top perspective view of a single-harness optical subassembly 60 in accordance with a representative embodiment shown secured to the first and second bulkhead adapters 4 and 5 (FIG. 1). The subassembly 60 has a central portion 61, a plurality of optics systems 62 disposed within an opening formed in the central portion 61, and first and second optical fiber holders 63 and 64, respectively, that are mechanically coupled on first ends of the holders 63 and 64 to the central portion 61 and on second ends of the holders 63 and 64 to the first and second bulkhead adapters 4 and 5, respectively. Each of the optics systems 62 is mechanically and optically coupled to ends of a plurality of optical fibers 65, which are typically ribbonized. In accordance with this representative embodiment, each optics system 62 is mechanically and optically coupled to ends of sixteen optical fibers 65.

In accordance with a representative embodiment, the first and second fiber holders 63 and 64, respectively, have cavities (not shown) inside of them through which the optical fibers 65 run. The optical fibers 65 are typically loose, i.e., unribbonized, inside of the cavities to allow them to cross if needed and to facilitate organization of the optical fibers 65 and coupling with the bulkhead adapters 4 and 5. The ends of the optical fibers 65 opposite the ends that are coupled to the optics systems 62 are mechanically and optically coupled to the back sides of the I/O port 6.

Figure 9:
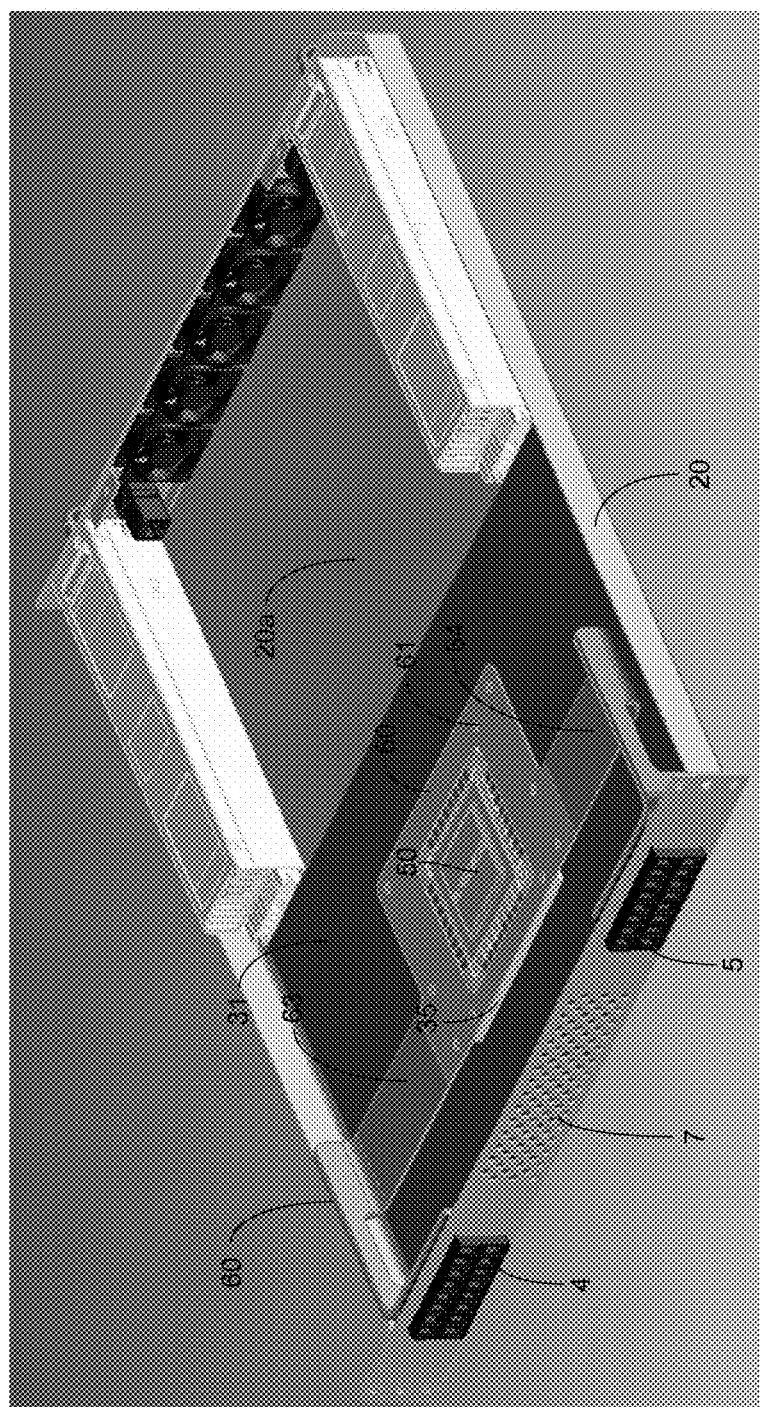
FIG. 9 illustrates a top perspective view of the bottom portion of the box shown in FIG. 4 having the optical MCM shown in FIGS. 7A and 7B mounted on a mounting flange of the adapter shown in FIGS. 6A and 6B with the single-harness optical subassembly shown in FIG. 8 mechanically coupled to the adapter and with the optics systems of the subassembly mechanically and optically coupled to the respective optical MCMs of the optical MCM.
Figure 10:
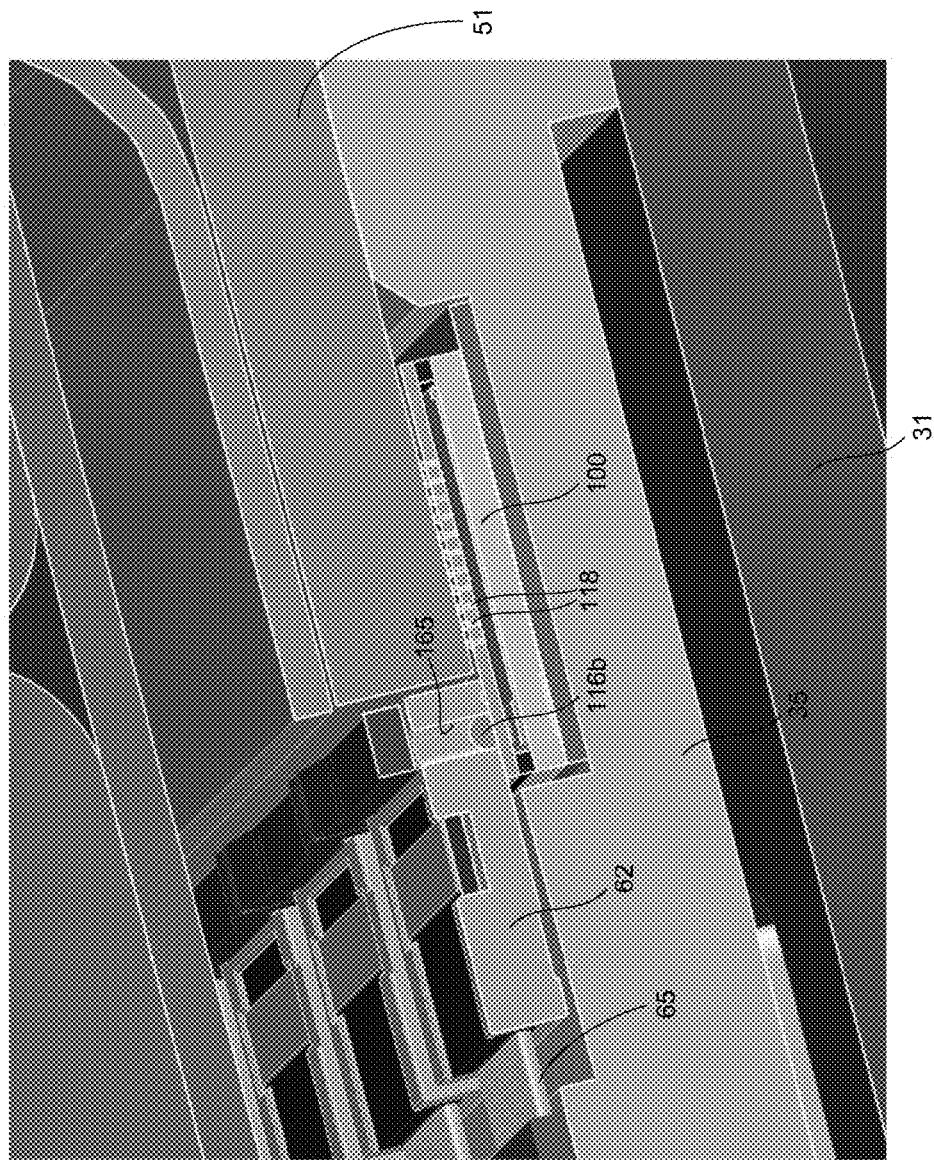
FIG. 10 is an enlarged cross-sectional view that shows the mechanical and optical coupling between one of the optical MCMs and one of the optics systems.

FIG. 9 illustrates a top perspective view of the bottom portion 20 of the box 2 shown in FIG. 4 having the optical MCM 50 mounted on the mounting flange 37 of the adapter 35 with the single-harness optical subassembly 60 mechanically coupled to the adapter 35 and with the optics systems 62 mechanically and optically coupled to the respective optical CSPs 100 (FIGS. 7A and 7B) of the optical MCM 50. FIG. 10 is an enlarged cross-sectional view that shows the mechanical and optical coupling between one of the optical CSPs 100 and one of the optics systems 62. As indicated above with reference to FIG. 7A, the optical CSPs 100 extend a distance from the periphery of the organic substrate 51. The optical CSPs 100 are designed such that the center of gravity of the optical CSPs 100 is over the portions of the optical CSPs 100 that are in contact with the organic substrate 51. The portions of the optical CSPs 100 that extend beyond the periphery of the organic substrate 51 have respective lens arrays (not shown) on them. Designing the optical CSPs 100 to extend a distance beyond the periphery of the organic substrate 51 allows the optics systems 62 to couple to the sides of the optical CSPs 100 through which enters and exists the optical CSPs 100.

The optics systems 62 have respective lens arrays (not shown) on the portions of the optics systems 62 that mechanically couple with the respective optical CSPs 100. When the optics systems 62 are mechanically coupled with the respective optical CSPs 100, the respective lens arrays are optically aligned with one another to achieve optical alignment between the ends of the optical fibers 65 (FIG. 8) held in the optics systems 62 and respective light sources or optical detectors of the optical CSPs 100, depending on whether the optical CSPs 100 comprises transmit channels or receive channels.

As will be described below in more detail, in accordance with a representative embodiment, each optical CSP 100 either has sixteen light sources (e.g., laser diodes) for generating sixteen optical signals, respectively, or sixteen optical detectors (e.g., photodiodes) for detecting sixteen optical signals, respectively. Each lens of the lens arrays of the optical CSPs 100 is aligned with a respective lens of a lens array of one of the optics systems 62. In this way, the optical signals are coupled between the optical CSPs 100 and the optics systems 62.

Figure 11A:
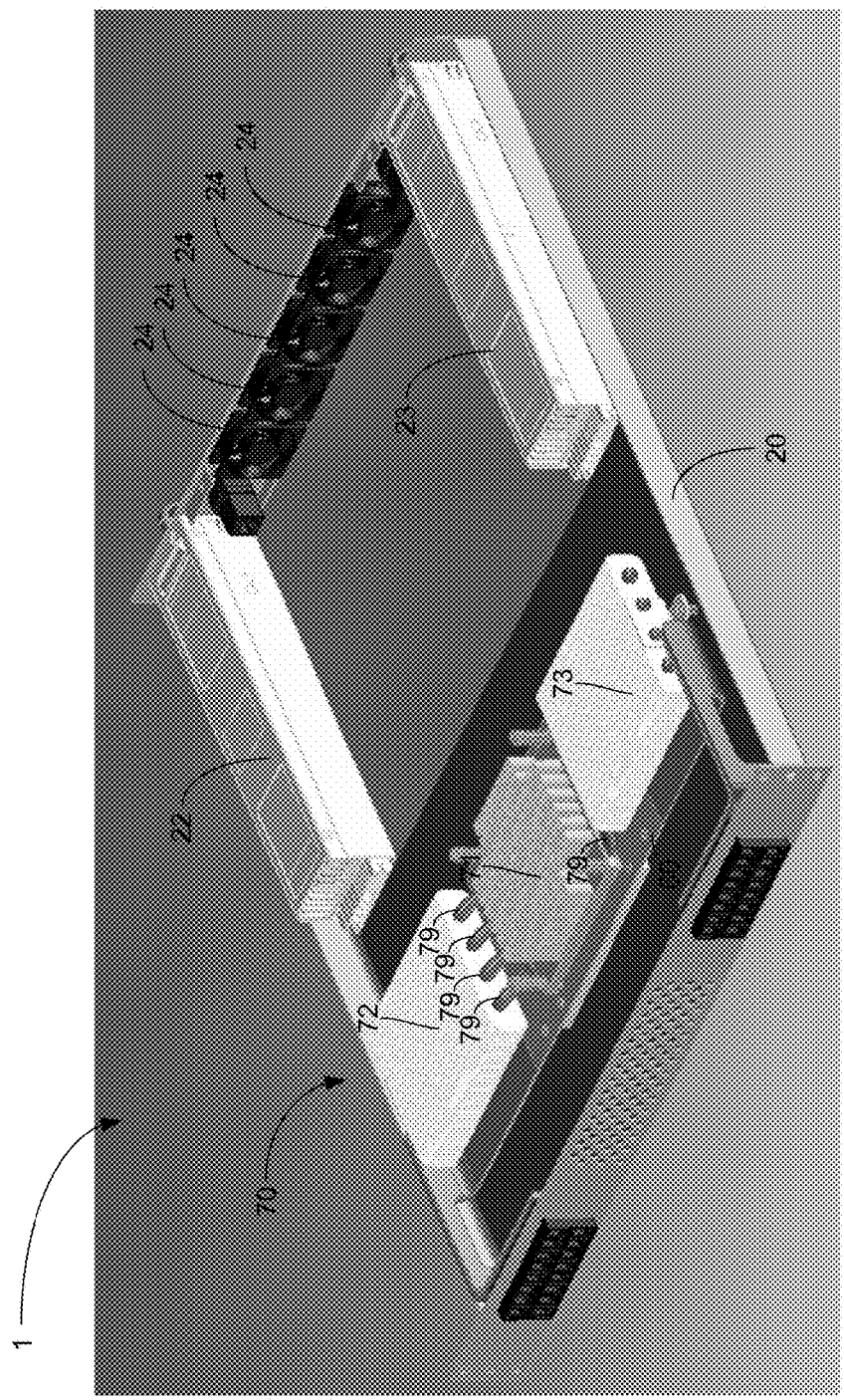
FIGS. 11A and 11B illustrates a top perspective view of the bottom portion of the box 2 shown in FIG. 9 having the optical MCM and the single-harness optical subassembly therein and having a thermal dissipation system disposed therein, shown in FIG. 11A without a plenum and shown in FIG. 11B with a plenum.
Figure 11B:
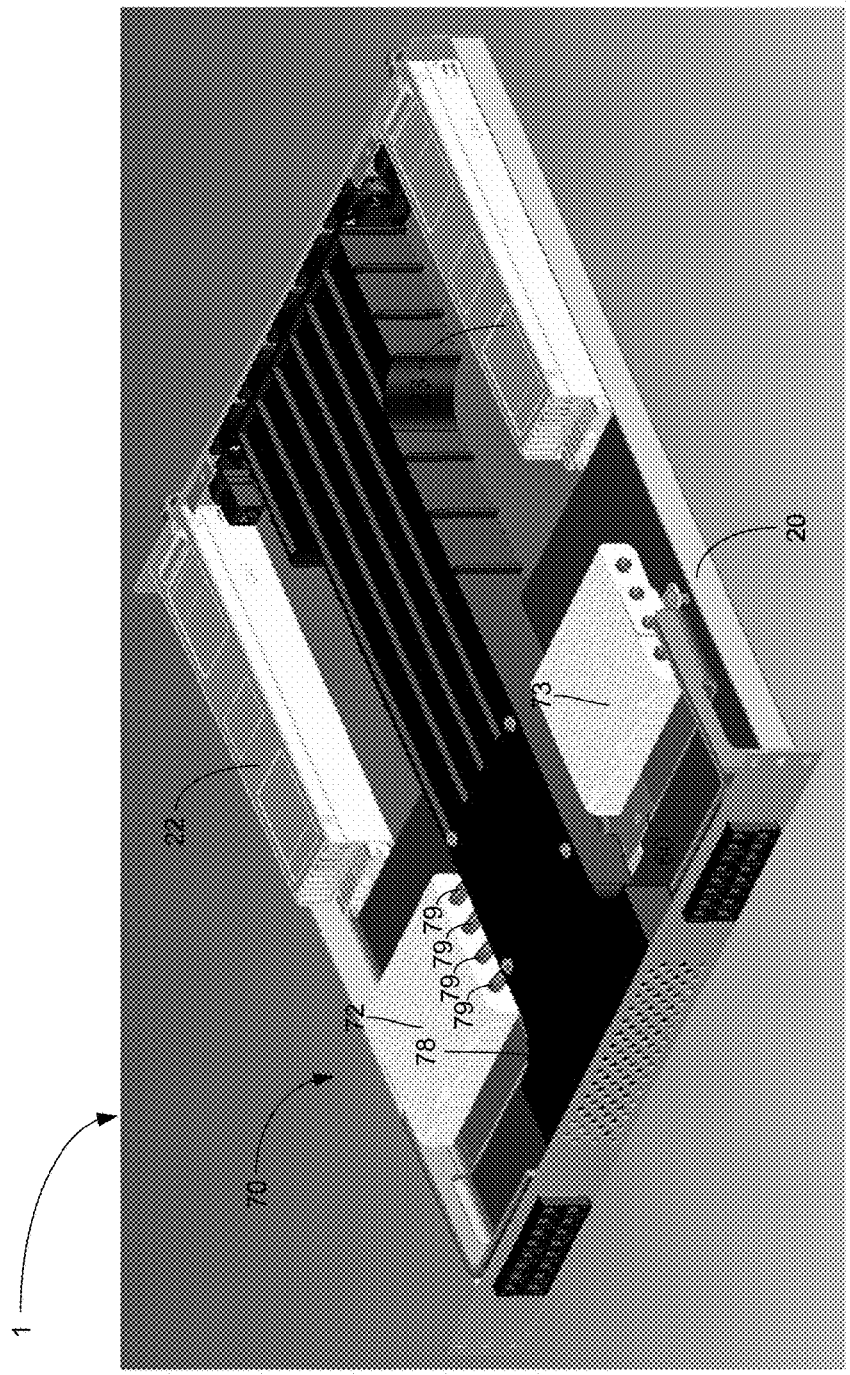

FIG. 11A illustrates a top perspective view of the bottom portion 20 of the box shown in FIG. 9 having the optical MCM 50 (FIG. 9) and the single-harness optical subassembly 60 therein and having a thermal dissipation system 70 disposed therein. The configuration of the single-harness optical subassembly 60 allows the thermal dissipation system 70 to be arranged in such a way that all of the components of the data communications system 1 can fit inside of a standard rackmount-sized box, which in this representative embodiment is a 1 U box. A heat sink 71 of the thermal dissipation system 70 is in contact with the metal lid 55 (FIG. 7A) of the optical MCM 50 so that heat generated by the switch IC chip (not shown) of the optical MCM 50 is thermally coupled from the switch IC chip through the metal lid 55 into the heat sink 71. The heat sink 71 has heat pipes 79 running through the bottom side thereof that extend into first and second radiators 72 and 73, respectively, of the thermal dissipation system 70. The heat pipes 79 move some of the heat generated by the optical MCM 50 away from the heat sink 71 and into the first and second radiators 72 and 73, respectively, where the heat is dissipated. Some of the heat generated by the optical MCM 50 is dissipated in the heat sink 71. The fans 24 create an air flow that flows through the box 2 (FIG. 1) to draw heat out of the box 2. FIG. 11B illustrates a top perspective view of the bottom portion 20 of the box 2 shown in FIG. 11A having a plenum 78 secured to the box 2. The plenum 78 directs the air flow created by the fans 24 through heat sink 71 for more effective cooling.

Figure 12:
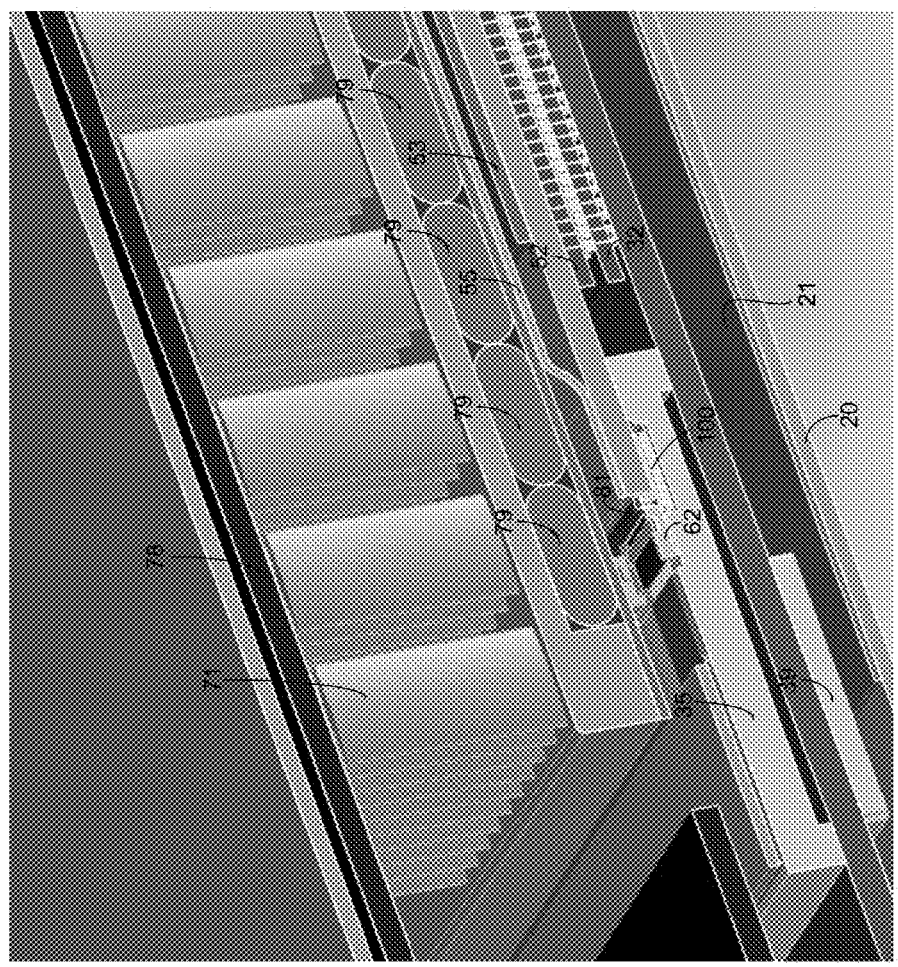
FIG. 12 illustrates an enlarged cross-sectional view of portions of the MCM, the adapter and the heat sink shown in FIGS. 11A and 11B.

FIG. 12 illustrates an enlarged cross-sectional view of portions of the optical MCM 50, the adapter 35 and the heat sink 71 shown in FIGS. 11A and 11B. The switch IC chip 53 of the optical MCM 50 is visible in FIG. 12. A lower surface of the heat sink 71 is in contact with the metal lid 55, but is not in contact with a clip 81 that is used to provide a downward force on the optics systems 62 to hold them in position against the respective optical CSPs 100. A portion of one of the heat blocks 39 (FIG. 6B) of the adapter 35 is also visible in FIG. 12. The thermal pathway for heat generated by the switch IC chip 53 of the optical MCM 50 is mostly upwards from the metal lid 55 of the optical MCM 50 into the heat sink 71. On the other hand, the thermal pathway for heat generated by the optical CSPs 100 is mostly downward from the optical CSPs 100 into the adapter 35, down into the heat blocks 39 of the adapter 35, and then into the thermal pad 21. Thus, the thermal pathways for the optical CSPs 100 are thermally isolated from the thermal pathways of the switch IC chip 53. This feature allows the switch IC chip 53 and the optical CSPs 100 to operate at different temperatures.

Figure 13A:
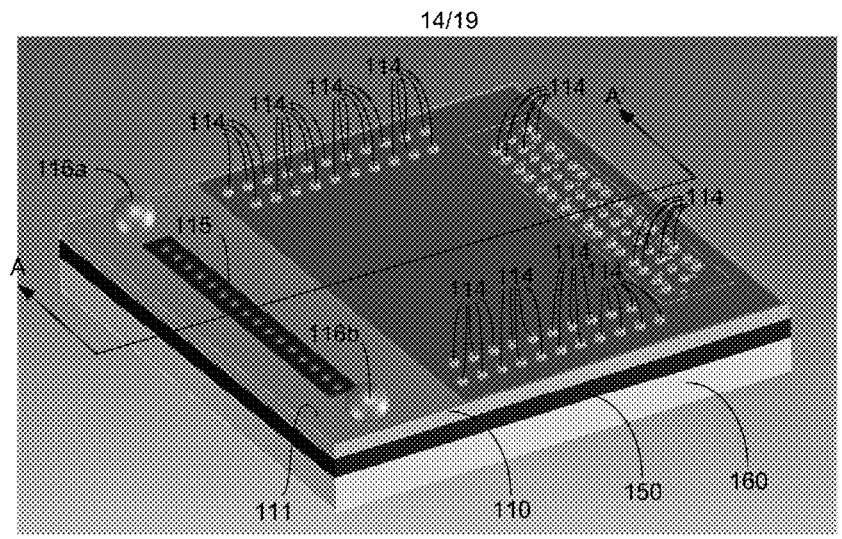
FIGS. 13A and 13B illustrate top and bottom perspective views, respectively, of the optical CSP in accordance with a representative embodiment.
Figure 13B:
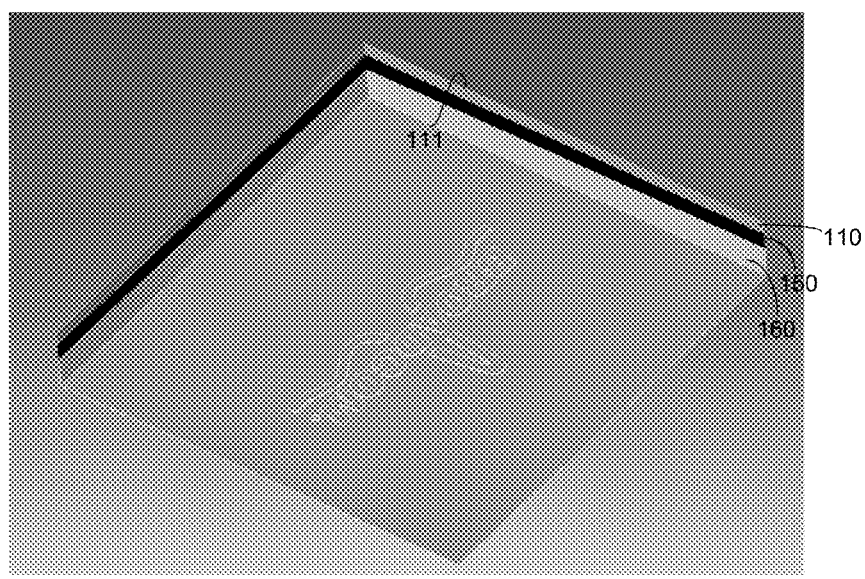
Figure 14:
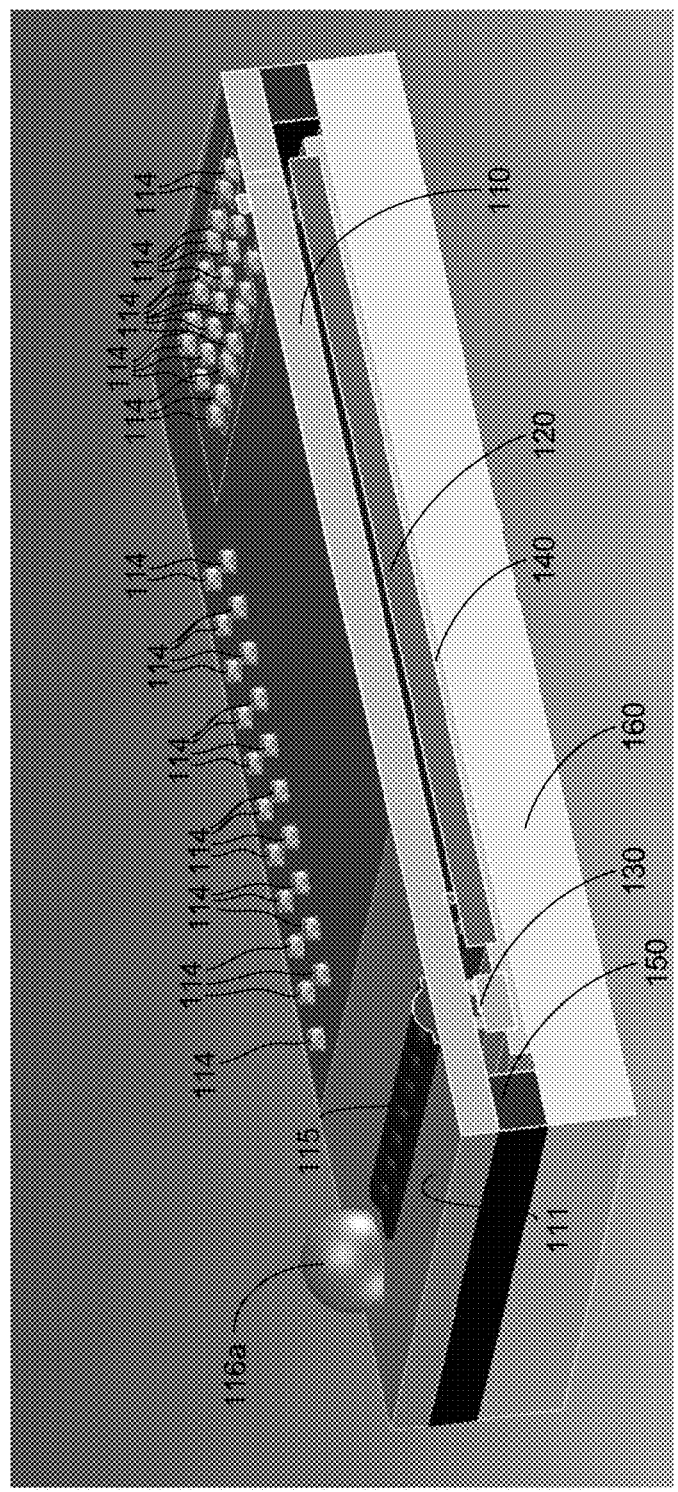
FIG. 14 illustrates a side cross-sectional view of the optical CSP taken along line A-A' shown in FIG. 13A.
Figure 15A:
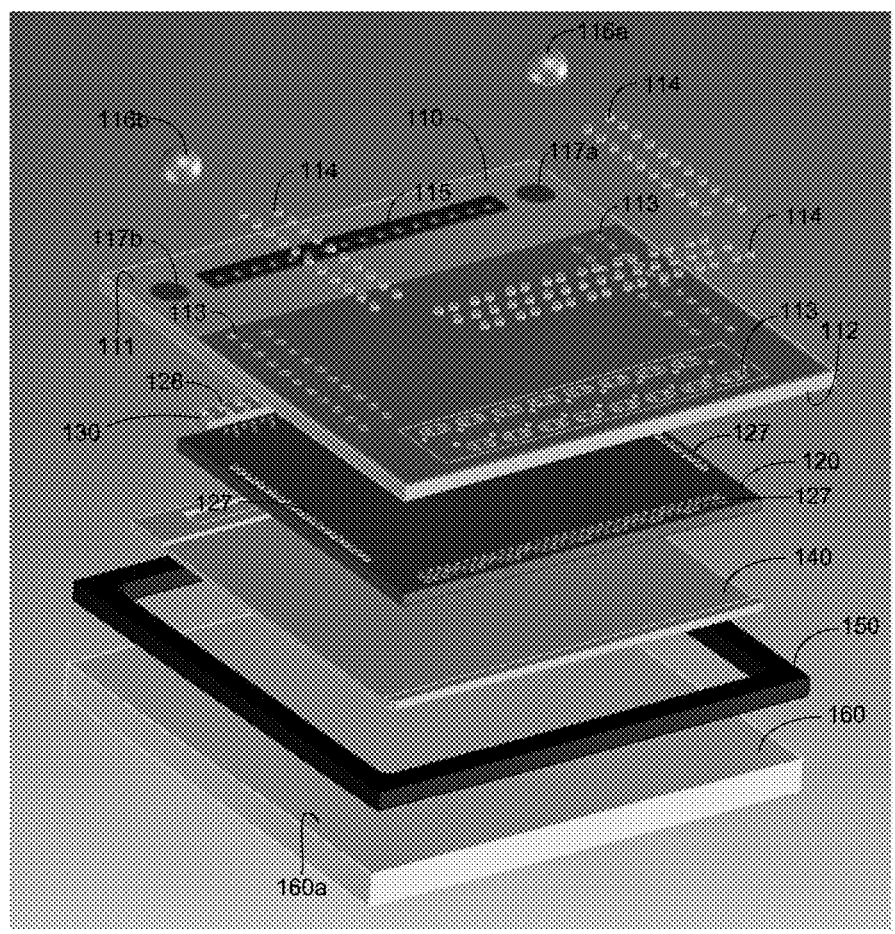
FIGS. 15A and 15B illustrate exploded top and bottom perspective views, respectively, of the optical CSP shown in FIGS. 13A-14.
Figure 15B:
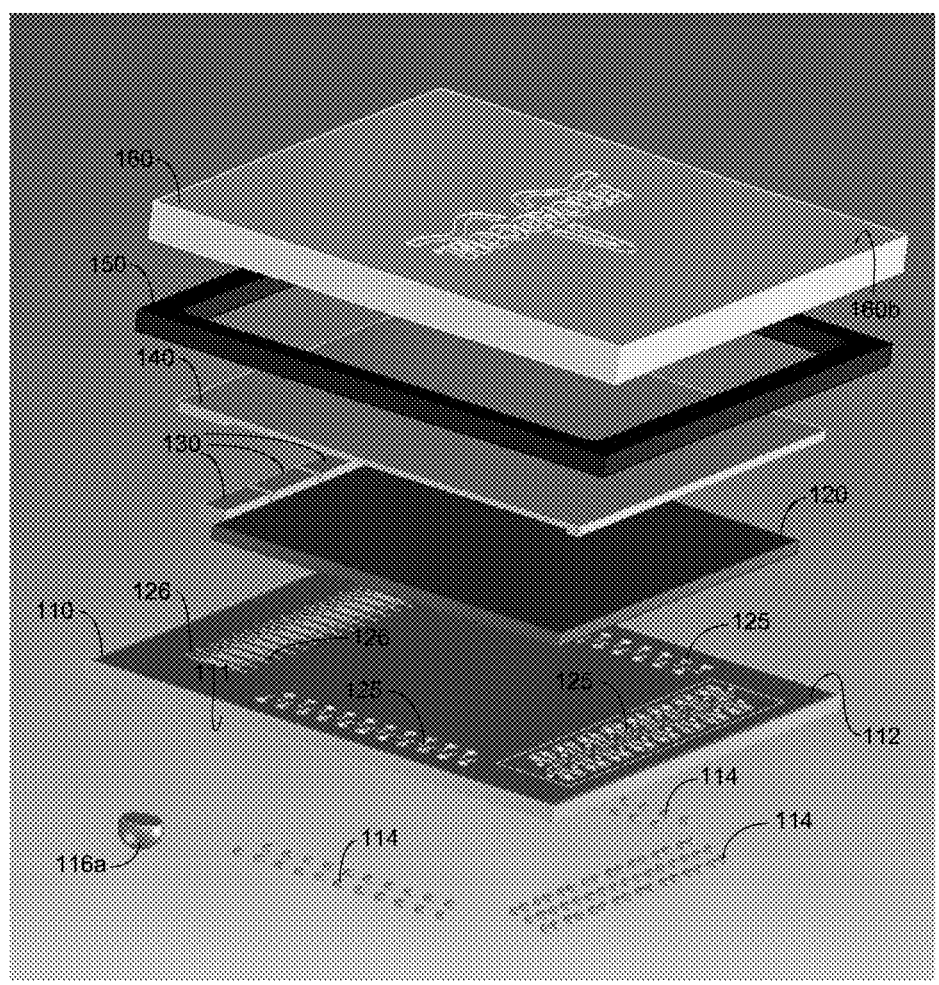

FIGS. 13A and 13B illustrate top and bottom perspective views, respectively, of the optical CSP 100 in accordance with a representative embodiment. FIG. 14 illustrates a side cross-sectional view of the optical CSP 100 taken along line A-A' shown in FIG. 13A. FIGS. 15A and 15B illustrate exploded top and bottom perspective views, respectively, of the optical CSP 100 shown in FIGS. 13A-14. The various components of the optical CSP 100 can be seen in the exploded perspective views shown in FIGS. 15A and 15B. The optical CSP 100 includes an interposer 110, an IC die 120, a plurality of optoelectronic dies 130, a layer of highly thermally conductive (HTC) material 140, a frame 150 and a lid 160 made of HTC material. The HTC material typically has a thermal conductivity that is greater than or equal to 50 watts per meter-kelvin. Heat generated by the IC die 120 and by the optoelectronic dies 130 is transferred through the HTC lid 160 into the adapter 35, as described above with reference to FIG. 12.

The interposer 110 has a top surface 111 and a bottom surface 112. The top surface 111 has a first electrical interface on it that comprises electrical contacts 113 and solder balls 114, which are positioned on the respective electrical contacts 113. The electrical contacts 113 and the solder balls 114 are used to electrically interconnect the optical CSPs 100 with the substrate 51 (FIG. 7B), thereby electrically interconnecting the optical CSPs 100 with the switch IC chip 53 (FIG. 12). The interposer 110 is made of a thermally-insulating material having a thermal conductivity that is less than or equal to about 3 watts per meter-kelvin. Making the interposer 110 of a thermally-insulating material isolates the heat generated by the switch IC chip 53 (FIG. 12) from the optical CSPs 100. The heat generated by the optical CSPs 100 will take a pathway that is generally downward into the adapter 35, as described above with reference to FIG. 10.

The top surface 111 of the interposer 110 also has a first array of lenses 115, which in this embodiment is a linear array of sixteen lenses 115. The top surface 111 has first and second solder balls 116a and 116b that are reflowed to first and second pad positions 117a and 117b, respectively. The first and second solder balls 116a and 116b, respectively, act as first and second passive alignment features for aligning the optics systems 62 (FIG. 8) with the respective optical CSPs 100, as will be described below in more detail.

The bottom surface 112 of the interposer 110 has a second electrical interface on it comprising electrical contacts 125 for electrically interfacing the interposer 110 with the IC die 120 and comprising electrical contacts 126 for electrically interfacing the interposer 110 with the optoelectronic dies 130. As indicated in FIGS. 15A and 15B, the IC die 120 and the optoelectronic dies 130 are flip-chip mounted on the bottom surface 112 of the interposer 110 such that copper pillars 127 (FIG. 15A) of the IC die 120 and electrical contacts 128 (FIG. 15A) of the optoelectronic dies 130 are in contact with the electrical contacts 125 and 126, respectively, of the second electrical interface disposed on the bottom surface 112 of the interposer 110. The electrical contacts 126 are used to electrically interconnect the optoelectronic dies 130 and IC die 120. When the optoelectronic dies 130 are flip-chip mounted on the bottom surface 112 of the interposer 110, the optoelectronic devices (e.g., the laser diodes or the photodiodes) of the optoelectronic dies 130 are aligned with respective lenses of the first array of lenses 115. The interposer 110 has electrically-conductive vias 118 (FIG. 10) formed therein that interconnect the electrical contacts 113 disposed on the top surface 111 of the interposer 110 with the electrical contacts 125 disposed on the bottom surface 112 of the interposer 110. The interposer 110 also has electrical conductors running through it in directions that are substantially parallel to the top and bottom surfaces 111 and 112, respectively.

The interposer 110 is transparent to operating wavelengths of light of the optoelectronic devices (e.g., laser diodes or photodiodes) of the optoelectronic dies 130. In accordance with a representative embodiment, the interposer 110 comprises a thermally-insulating material. As will be described below in more detail, in accordance with a representative embodiment, the interposer 110 has optical elements (not shown) disposed on the bottom surface 112 thereof that work with the lenses of the first array of lenses 115 to couple light of the operating wavelengths between the optoelectronic devices of the optoelectronic dies 130 and the optics systems 62 (FIG. 8).

The frame 150 provides space for locating the IC die 120 and the optoelectronic dies 130 in between a front surface 160a (FIG. 15A) of the lid 160 and the bottom surface 112 of the interposer 110. After the IC die 120 and the optoelectronic dies 130 have been flip-chip mounted and reflowed at the proper locations on the bottom surface 112 of the interposer 110, another solder reflow process is performed to flow the solder balls 114 in order to make the electrical interconnections between the interposer 110 and the substrate 51 (FIG. 7B). The solder balls 114, 116a and 116b are made of preselected material that melts and reflows at a lower temperature than the solder balls that are used on the optoelectronic dies 130 and the copper pillars 127 of the IC die 120 so that the reflow process does not affect the integrity of the solder balls that are used on the optoelectronic dies 130 or the copper pillar of the IC die 120.

An alternative to using the frame 150 is to form a recessed area in the front surface 160a of the lid 160 opposite a back surface 160b of the lid 160. By forming a recessed area in the front surface 160a of the lid 160, the non-recessed portion of the front surface 160a acts as a spacer that distances the recessed area of the front surface 160a a particular distance away from the bottom surface 112 of the interposer 110 to provide space for the IC die 120 and for the optoelectronic dies 130.

The optical CSPs 100 shown in FIGS. 7A and 7B are typically either optical transmitters comprising N laser diodes (e.g., vertical cavity surface emitting laser diodes (VCSELs)) or optical receivers comprising N photodiodes (e.g., P-intrinsic-N (PIN) diodes), where N is a positive integer that is greater than or equal to 1. In accordance with the representative embodiment described herein, N=16. Thus, in accordance with this representative embodiment, the first array of lenses 115 either couples sixteen optical signals generated by the laser diodes onto the respective lenses of the respective optics system 62 or couples light received from the lenses of the respective optics system 62 onto respective photodiodes of the optical CSP 100. In cases where the optical CSP 100 is an optical transmitter, the IC die 120 comprises a laser diode driver IC die. In cases where the optical CSP 100 is an optical receiver, the IC die 120 comprises a transimpedance amplifier (TIA) IC die.

With reference again to FIG. 10, the manner in which the optics systems 62 mechanically and optically coupled with the optical CSPs 100 can be seen. The passive alignment features 116a and 116b of the optical CSPs 100 mate with respective openings 165 formed in the bodies of the optics systems 62 in an interference fit to align the lenses of the optics systems 62 with the respective lenses of the first array of lenses 115 of the optical CSPs 100. As will now be described with reference to FIGS. 16 and 17, each of the optical CSPs 100 may also include a second array of lenses that works with the first array of lenses 115 to relax alignment tolerances. The apertures of laser diodes are typically sufficiently small that the second array of lenses is not needed to relax alignment tolerances, although they may be needed to relax tolerances with respect to alignment of the apertures of the photodiodes.

For optical CSPs 100 that function as optical transmitters, the aperture diameter of a typical high-speed VCSEL is typically a few microns. The lenses of the first array of lenses 115 will image the apertures of the respective VCSELs to the core of the respective optical fibers. For multimode operation, the diameter of the cores of the optical fibers is typically about 50 microns. The lenses of the first array of lenses 115 typically magnify the aperture of the VCSELs by a factor of 1 to 2. Hence, the size of the image of the VCSEL aperture at the tip of the fiber is typically less than about 20 microns. This will easily fit into the 50-micron core diameter. For optical CSPs 100 that function as optical receivers, the light from the tip of the fiber needs to be focused to the aperture of the photodiode, which is typically a P-intrinsic-N (P-I-N) diode. Because the tip of the fiber is typically about 50 microns for multimode fiber, and the aperture of a high-speed P-I-N diode is typically about 30 microns or less, the optics system of the optical CSP 100 needs to demagnify the image of the fiber tip to the aperture of the P-I-N diode. A 3× demagnification produces a fiber tip image of 16 microns, which provides 7 microns of alignment. In the real world, the image of the fiber tip may have distortion, and there could be temperature effects. Therefore, alignment tolerance is further reduced. The second array of lenses helps to relax the tolerance.

Figure 16:
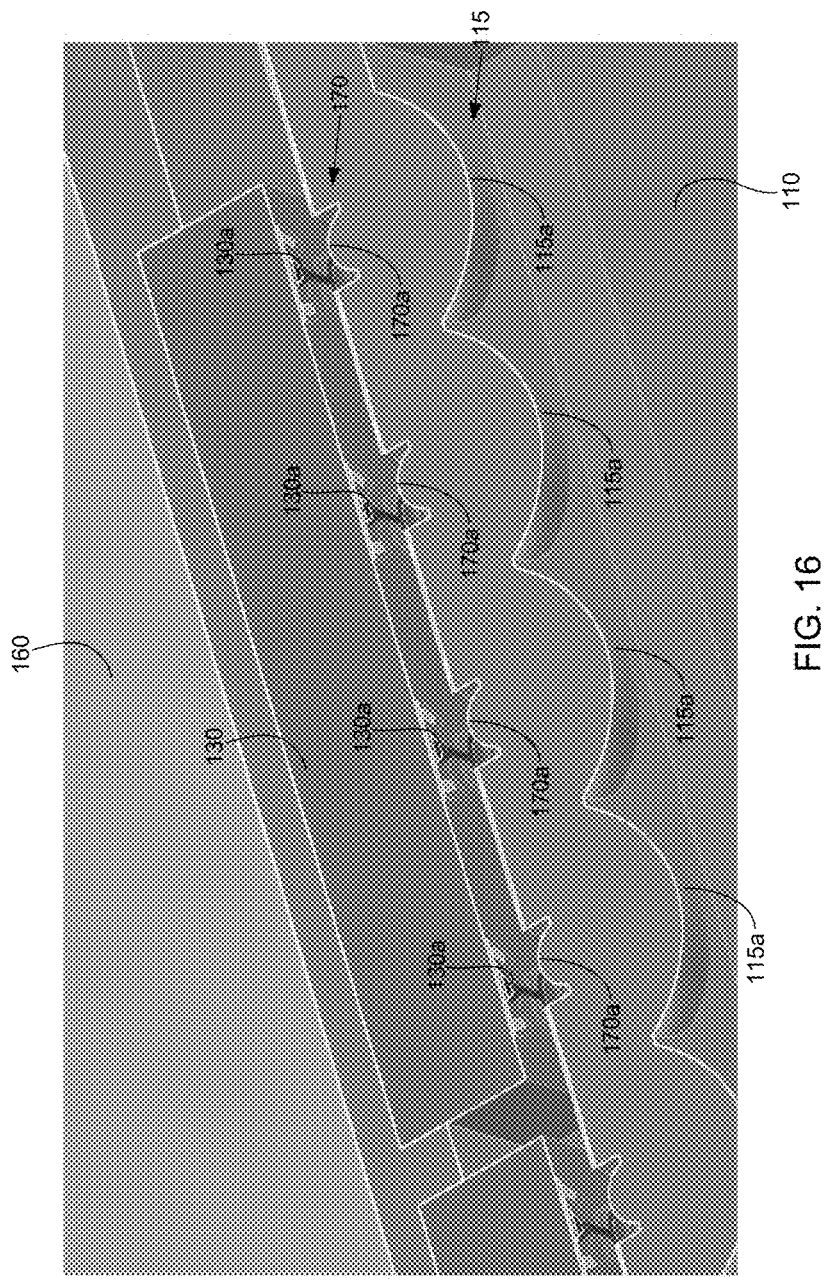
FIG. 16 illustrates a cross-sectional perspective view of the interposer and one of the optoelectronic dies shown in FIGS. 15A and 15B having a second array of lenses formed in the back surface of the interposer.

FIG. 16 illustrates a cross-sectional perspective view of the interposer 110 and one of the optoelectronic dies 130. As indicated above, in accordance with a representative embodiment, not only is there the first array of lenses 115 formed in the top surface 111 of the interposer 110, there is also a second array of lenses formed on the back surface 112 of the interposer 110. The first and second arrays of lenses can have a variety of configurations. In accordance with the representative embodiment shown in FIG. 16, the lenses 115a and 170a of the first and second arrays of lenses 115 and 170, respectively, are curved lenses that operate refractively on light of the operating wavelength of the optoelectronic dies 130. The lenses 170a are disposed in between respective lenses 115a and respective apertures 130a of the optoelectronic die 130 and are in optical alignment with the respective lenses 115a and the respective apertures 130a. The lenses 170a are spaced a predetermined distance away from the respective apertures 130a. Including the second array of lenses 170 in the interposer 110 relaxes alignment tolerance between the lenses 115a and the apertures 130a.

In accordance with this representative embodiment, in which N=16, there are four optoelectronic dies 130 mounted on the interposer 110, each having four optoelectronic devices, although a single optoelectronic die that has N optoelectronic devices could instead be used. Conversely, each optoelectronic die could have a single optoelectronic device such that N optoelectronic dies are mounted on the interposer 110.

Figure 17:
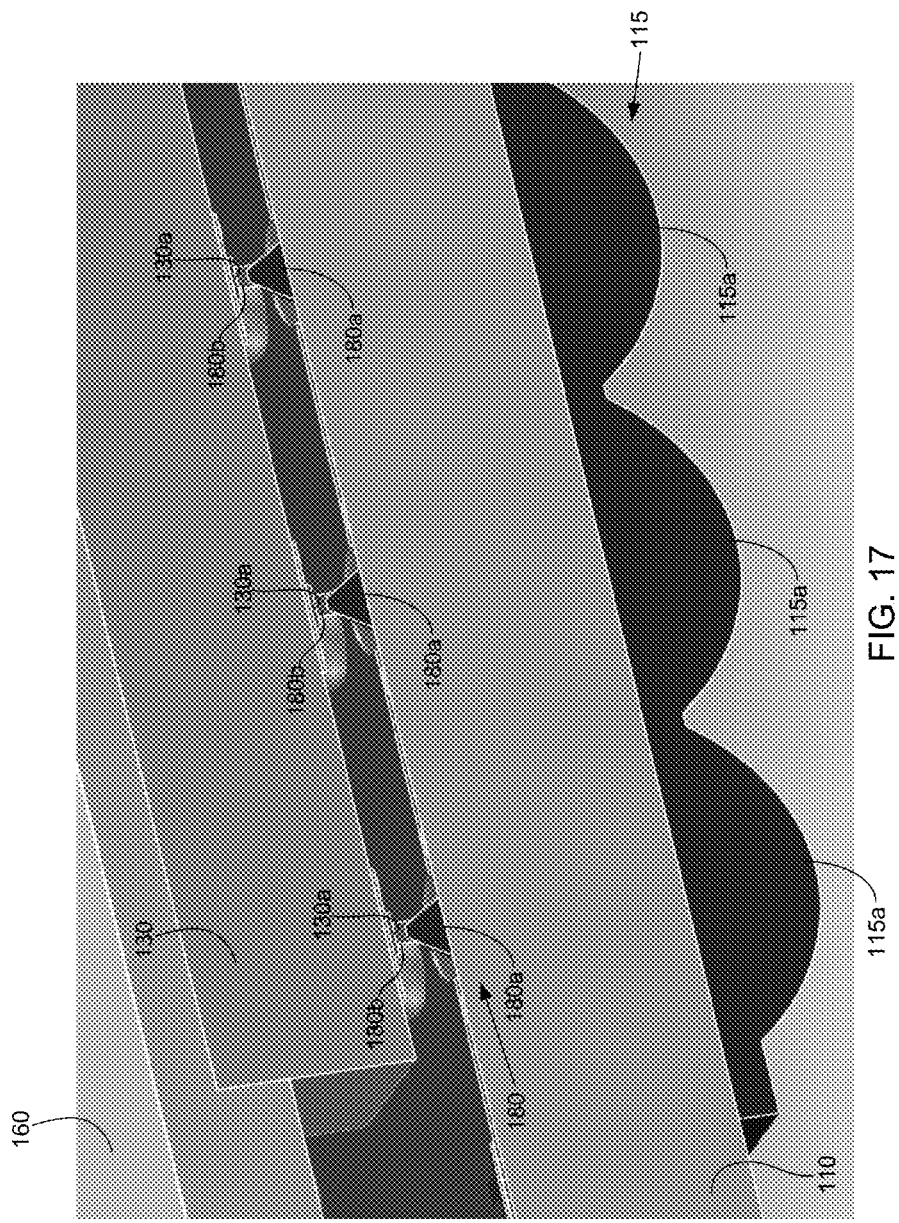
FIG. 17 illustrates a cross-sectional perspective view of the interposer and one of the optoelectronic dies shown in FIGS. 15A and 15B having a second array of lenses formed on the back surface of the interposer in accordance with another representative embodiment.

FIG. 17 illustrates a cross-sectional perspective view of the interposer 110 and one of the optoelectronic dies 130 having a second array of lenses 180 formed on the back surface 112 of the interposer 110 in accordance with another representative embodiment. In accordance with the representative embodiment shown in FIG. 17, the lenses 115a of the first array of lenses 115 are curved lenses that operate refractively on light of the operating wavelength of the optoelectronic dies 130, whereas the lenses 180a of the second array of lenses 180 are conical in shape. The lenses 180a are disposed in between respective lenses 115a and the respective apertures 130a of the optoelectronic die 130 and are in optical alignment with the respective lenses 115a and with the respective apertures 130a. The lenses 180a are spaced a predetermined distance away from the respective apertures 130a.

The conical shape of the lenses 180a causes the light to be reflected internally within the cone shapes due to total internal reflection. In this representative embodiment, the tips of the lenses 180a are flat, although could instead be curved. The tips of the lenses 180a are either near or are touching the apertures 130a. In some embodiments, optical bridges 180b extend from the respective tips of the lenses 180a to the respective apertures 130a. The optical bridges may be formed by, for example, depositing photoresist on the apertures 130a and heating, or reflowing, the photoresist. The optical bridges 180b can provide improved light guiding between the tips of the lenses 180a and the apertures 130a. As with lenses 170a shown in FIG. 16, including the lenses 180a shown in FIG. 17 relaxes alignment tolerance between the lenses 115a and the apertures 130a. A variety of materials may be used to form the optical bridges 180b, including, for example, an optical epoxy material.

The lenses 170a and 180a and the lenses 115a can be integrally formed in the interposer 110 or they can be elements that are formed separately of the interposer 110 and subsequently secured to the interposer 110. The conically-shaped lenses 180a shown in FIG. 17 are typically formed via a wafer-level casting process or via a molding process. It should be noted that the inventive principles and concepts are not limited with respect to the configurations of the lenses 115a, 170a and 180a or with respect to the manner in which they are formed.

It should be noted that the inventive principles and concepts are not limited to the representative embodiments, as will be understood by those of skill in the art in view of the description provided herein. For example, while the optical CSP 100 has been described with reference to its use in the systems 1 and 10 shown in FIGS. 1 and 2, respectively, the optical CSP 100 is not limited with respect to the system in which it is used, as will be understood by persons of skill in the art in view of the description provided herein. Also, while the optical CSP 100 has been described for exemplary purposes as having a particular configuration for exemplary purposes, many modifications may be made to the configuration described herein within the scope of the inventive principles and concepts. Persons of skill in the art will understand, in view of the description provided herein, that a variety of modifications may be made to the representative embodiments described herein and that such modifications are within the scope of the inventive principles and concepts.

What is claimed is:

1. An optical chip-scale package (CSP) comprising:
   an interposer having a top surface and a bottom surface, the top and bottom surfaces of the interposer having a first and a second electrical interface thereon, respectively, the first and second electrical interfaces comprising a first plurality and a second plurality of electrical contacts, respectively, the interposer having electrical conductors and electrical vias therein;
   at least a first array of lenses disposed on the interposer, the first array of lenses having N lenses, where N is a positive integer that is greater than or equal to one;
   an integrated circuit (IC) die having a first side and a second side, the first side of the IC die having a plurality of electrical contacts thereon, the IC die being flip-chip mounted on the bottom surface of the interposer such that electrical contacts of the IC die are in contact with respective electrical contacts of said second plurality of electrical contacts; and
   at least a first optoelectronic die mounted on the interposer, the first optoelectronic die having a plurality of electrical contacts thereon and having at least N optoelectronic devices integrated therein having N apertures, respectively, and wherein electrical contacts of said at least a first optoelectronic die are electrically coupled with respective electrical contacts of one of the first and second pluralities of electrical contacts, and wherein electrical contacts of said at least a first optoelectronic die are electrically coupled via the electrical conductors of the interposer with electrical contacts of the plurality of electrical contacts disposed on the first side of the IC die.

2. The optical CSP of claim 1, wherein the first optoelectronic die is flip-chip mounted on the bottom surface of the interposer such that the electrical contacts of said at least a first optoelectronic die are in contact with respective electrical contacts of the second plurality of electrical contacts disposed on the bottom surface of the interposer, and wherein the N lenses are optically aligned with the N apertures.

3. The optical CSP of claim 1, wherein said at least a first optoelectronic die comprises a plurality of optoelectronic dies that are flip-chip mounted on the bottom surface of the interposer such that electrical contacts of the optoelectronic dies are in contact with respective electrical contacts of the second plurality of electrical contacts disposed on the bottom surface of the interposer, each optoelectronic die comprising a plurality of optoelectronic devices, and wherein the N lenses are optically aligned with the N apertures of the optoelectronic devices.

4. The optical CSP of claim 1, wherein said at least a first optoelectronic die comprises N optoelectronic dies that are flip-chip mounted on the bottom surface of the interposer such that electrical contacts of the optoelectronic dies are in contact with respective electrical contacts of the second plurality of electrical contacts disposed on the bottom surface of the interposer, each optoelectronic die comprising a single optoelectronic device, and wherein the N lenses are optically aligned with the N apertures of the N optoelectronic devices.

5. The optical CSP of claim 1, wherein the interposer is transparent to an operating wavelength of said at least N optoelectronic devices, wherein the first array of lenses is formed in or disposed on the top surface of the interposer, and wherein the optical CSP further comprises:
a second array of lenses formed in or disposed on the interposer, the second array of lenses comprising N lenses, each lens of the second array of lenses being positioned in between a respective aperture and a lens of the first array of lenses.

6. The optical CSP of claim 1, wherein the interposer comprises a thermally-insulating material having a thermal conductivity that is less than or equal to 3 watts per meter-kelvin.

7. The optical CSP of claim 1, further comprising:
at least a first passive alignment device disposed on the top surface of the interposer for passively aligning an external optics system with the first array of lenses, wherein when the external optics system is passively aligned with the first array of lenses, each of the N lenses is optically aligned with a respective optical pathway of the external optics system for coupling respective optical signals between the lenses of the first array of lenses and the respective optical pathways of the external optics system.

8. The optical CSP of claim 1, further comprising:
a lid made of a highly thermally conductive (HTC) material, the lid having a front surface and a back surface, the front surface of the lid being mechanically and thermally coupled to the IC die and to said at least a first optoelectronic die.

9. The optical CSP of claim 8, wherein the HTC material has a thermal conductivity that is greater than or equal to 50 watts per meter-kelvin.

10. The optical CSP of claim 8, further comprising:
a frame that mechanically couples the front surface of the lid to the bottom surface of the interposer, the frame having a first side that is mechanically coupled to the bottom surface of the interposer and having a second side that is mechanically coupled to the front surface of the lid, and wherein the frame spaces the front surface of the lid a predetermined distance away from the bottom surface of the interposer to provide space for at least the first IC die.

11. The optical CSP of claim 8, further comprising:
a layer of thermally-conductive material is disposed in between and in contact with the front surface of the lid and the second side of the IC die.

12. The optical CSP of claim 11, wherein said N apertures are located in a front side of said at least a first optoelectronic die, and wherein the layer of thermally-conductive material is also in contact with a back side of said at least a first optoelectronic die opposite the front side of said at least a first optoelectronic die.

13. An optical chip-scale package (CSP) comprising:
an interposer having a top surface and a bottom surface, the top and bottom surfaces of the interposer having a first and a second electrical interface thereon, respectively, the first and second electrical interfaces comprising a first plurality and a second plurality of electrical contacts, respectively, the interposer having electrical conductors and electrical vias therein and being transparent to an operating wavelength of light;
at least a first array of lenses disposed on the top surface of the interposer on a portion of the interposer that does not include the first and second electrical interfaces and that is configured to extend a distance beyond a periphery of a substrate on which the optical CSP will be mounted, the first array of lenses having N lenses, where N is a positive integer that is greater than or equal to two;
an integrated circuit (IC) die having a first side and a second side, the first side of the IC die having a plurality of electrical contacts thereon, the IC die being flip-chip mounted on the bottom surface of the interposer such that the electrical contacts of the IC die are in contact with respective electrical contacts of the second plurality of electrical contacts; and
at least a first optoelectronic die flip-chip mounted on the bottom surface of the interposer such that a plurality of electrical contacts of said at least a first optoelectronic die are in contact with respective electrical contacts of the second plurality of electrical contacts disposed on the bottom surface of the interposer, the first optoelectronic die having at least N optoelectronic devices integrated therein having N apertures, respectively, said operating wavelength of light being an operating wavelength of light of the N optoelectronic devices, and wherein the N lenses are optically aligned with the N apertures, and wherein electrical contacts of said plurality of electrical contacts of said at least a first optoelectronic die are electrically coupled by the electrical conductors or vias of the interposer with electrical contacts of the plurality of electrical contacts disposed on the first side of the IC die.

14. The optical CSP of claim 13, further comprising:
a second array of lenses disposed on the interposer, the second array of lenses comprising N lenses, each lens of the second array of lenses being positioned in between a respective aperture of the N apertures and a lens of the first array of lenses.

15. The optical CSP of claim 13, wherein the interposer comprises a thermally-insulating material.

16. The optical CSP of claim 13, further comprising:
at least a first passive alignment device disposed on the top surface of the interposer for engaging at least a first passive alignment device of an external optics system via an interference fit to passively aligning the external optics system with the first array of lenses, wherein when the external optics system is passively aligned with the first array of lenses, each of the N lenses is optically aligned with a respective optical pathways of the external optics system for coupling respective optical signals between the lenses of the first array of lenses and the respective optical pathways of the external optics system.

17. The optical CSP of claim 13, further comprising:

a lid made of a highly thermally conductive (HTC) material, the lid having a front surface and a back surface, the front surface of the lid being mechanically and thermally coupled to the IC die and to said at least a first optoelectronic die.

18. The optical CSP of claim 17, further comprising:

a frame that mechanically couples the front surface of the lid to the bottom surface of the interposer, the frame having a first side that is mechanically coupled to the bottom surface of the interposer and having a second side that is mechanically coupled to the front surface of the lid, and wherein the frame spaces the front surface of the lid a predetermined distance away from the bottom surface of the interposer to provide space for at least the first IC die.

19. The optical CSP of claim 17, further comprising:

a layer of thermally-conductive material disposed in between and in contact with the front surface of the lid and the second side of the IC chip.

20. A single-harness optical subassembly configured for use with the optical CSP of claim 13, comprising:

a central portion having an opening therein;

a plurality of optics systems disposed along a periphery of the opening, each optics system being adapted to mechanically and optically couple with the interposer of a respective optical CSP along the portion of the interposer on which the first array of lenses is disposed;

a first optical fiber holder having a first end that is mechanically coupled with a first side of the central portion, the first optical fiber holder having a second end that is mechanically coupled with a first bulkhead adapter;

a second optical fiber holder having a first end that is mechanically coupled with a second side of the central portion, the second optical fiber holder having a second end that is mechanically coupled with a second bulkhead adapter;

a first plurality of optical fibers extending from a first plurality of the optics systems over the first optical fiber holder to the first bulkhead adapter; and a second plurality of optical fibers extending from a second plurality of the optics systems over the second optical fiber holder to the second bulkhead adapter.

21. The single-harness optical subassembly of claim 20, wherein the first and second bulkhead adapters each comprise first and second pluralities of adapters, each adapter having a first receptacle configured to mate with a first multi-optical fiber (MF) connector that is configured to hold ends of a plurality of optical fibers.

\* \* \* \* \*